US011949186B2

(12) United States Patent
Chin

(10) Patent No.: US 11,949,186 B2
(45) Date of Patent: Apr. 2, 2024

(54) ELECTRICAL CONNECTOR

(71) Applicant: ENERGY FULL ELECTRONICS CO., LTD., New Taipei (TW)

(72) Inventor: Hsu-Shen Chin, New Taipei (TW)

(73) Assignee: ENERGY FULL ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 18/197,786

(22) Filed: May 16, 2023

(65) Prior Publication Data

US 2023/0283008 A1 Sep. 7, 2023

Related U.S. Application Data

(63) Continuation of application No. 17/505,717, filed on Oct. 20, 2021, now Pat. No. 11,688,969.

(30) Foreign Application Priority Data

Aug. 18, 2021 (TW) ................................ 110209776

(51) Int. Cl.
*H01R 12/71* (2011.01)
*H01R 12/55* (2011.01)
*H01R 13/405* (2006.01)
*H01R 13/502* (2006.01)
*H01R 13/52* (2006.01)

(52) U.S. Cl.
CPC ......... *H01R 13/5213* (2013.01); *H01R 12/55* (2013.01); *H01R 12/71* (2013.01); *H01R 13/405* (2013.01); *H01R 13/502* (2013.01); *H01R 13/5202* (2013.01)

(58) Field of Classification Search
CPC .... H01R 13/5213; H01R 12/55; H01R 12/71; H01R 13/405; H01R 13/502; H01R 13/5202
See application file for complete search history.

(56) References Cited

U.S. PATENT DOCUMENTS

2017/0338585 A1* 11/2017 Wang ................. H01R 13/6585
2018/0034196 A1* 2/2018 Liu .................... H01R 13/6581

FOREIGN PATENT DOCUMENTS

CN 111129851 A * 5/2020

* cited by examiner

*Primary Examiner* — Tho D Ta
(74) *Attorney, Agent, or Firm* — Rivka Friedman

(57) ABSTRACT

An electrical connector includes a metal shell and a cover. The metal shell includes first, second, third, and fourth side walls that define a first opening, an accommodating space, and a second opening. The cover includes a flat plate portion covering the first opening, and two fixing portions extending from the flat plate portion to the accommodating space. At the first opening, a length of the plate portion is greater than a distance from an outer surface of the second side wall to an outer surface of the fourth side wall, or a width of the flat plate portion is greater than a distance from an outer surface of the first side wall to an outer surface of the third side wall. The fixing portions respectively contact the second side wall and the fourth side wall, or each fixing portion contacts the first side wall and the third side wall.

20 Claims, 12 Drawing Sheets

ELECTRICAL CONNECTOR

CROSS REFERENCE

This application is a continuation application claiming priority under 35 U.S.C. § 120 to U.S. patent application Ser. No. 17/505,717, entitled "ELECTRICAL CONNECTOR", filed Oct. 20, 2021, which claims priority to Taiwan Patent Application Ser. No. 110209776 titled "ELECTRICAL CONNECTOR", filed on Aug. 18, 2021, the entire disclosures of which are hereby incorporated by reference herein.

FIELD OF INVENTION

The present disclosure relates to the technical field of electrical connectors, and particularly to an electrical connector with a cover.

BACKGROUND

Currently, in order to automatically solder electrical connectors to printed circuit boards, each of the electrical connectors is generally provided with a cover having a flat surface. An automatic machine can move the electrical connectors to the printed circuit boards printed with solder paste by vacuum sucking the flat surfaces of the covers.

However, the electrical connectors are easy to fall off from the covers when the covers are vacuum sucked by the automated machine, and offset during soldering. In addition, components of a current cover for fixing to the electrical connector generally increase an overall volume of the electrical connector, which cannot meet the trend of miniaturization of electrical connectors.

SUMMARY OF DISCLOSURE

In order to solve the above technical problem, the present disclosure provides an electrical connector comprising a metal shell and a cover. The metal shell comprises a first side wall, a second side wall, a third side wall, and a fourth side wall connected in sequence. The first side wall, the second side wall, the third side wall, and the fourth side wall define an accommodating space, a first opening, and a second opening. The first opening and the second opening are respectively located at two opposite sides of the accommodating space. The first side wall comprises a first layer and a second layer. The first layer faces the third side wall, the second layer faces the third side wall and is away from the third side wall. The first layer is provided with two buckle grooves. An extension direction of the two buckle grooves is a direction from the first opening to the second opening, and an end of each of the two buckle grooves is flush with a side of the first layer close to the second opening. The cover comprises a flat plate portion and two fixing portions. The flat plate portion covers the first opening of the metal shell. A length of the plate portion is greater than a distance from an outer surface of the second side wall to an outer surface of the fourth side wall at the first opening, or a width of the flat plate portion is greater than a distance from an outer surface of the first side wall to an outer surface of the third side wall at the first opening. The two fixing portions extend from the flat plate portion and are disposed in the accommodating space of the metal shell. The two fixing portions respectively contact the second side wall and the fourth side wall, or each of the two fixing portions contacts the first side wall and the third side wall.

In an embodiment, each of the fixing portions comprises a first plate, a curved portion, and a second plate that extend from the flat plate portion.

In an embodiment, the two curved portions respectively contact the second side wall and the fourth side wall, or the two first plates contact the first side wall, and a free end of each of the second plates contacts the third side wall.

In an embodiment, each of the first plates is provided with a buckle member buckled in the corresponding buckle groove.

In an embodiment, the two buckle grooves are rectangular.

In an embodiment, the electrical connector further comprises a sealing ring. The sealing ring is sleeved on a part of the metal shell near the first opening and contacts the flat plate portion of the cover to seal a gap between the metal shell and the cover.

In an embodiment, the electrical connector further comprises an insulator and a waterproof glue layer. The insulator is disposed in the accommodating space of the metal shell and comprises a base close to the second opening and a tongue plate extending from the base toward the first opening. The waterproof glue layer is disposed between the base and the metal shell to seal a gap between the base and the metal shell.

In an embodiment, each of two opposite surfaces of the base of the insulator respectively facing the first side wall and the third side wall is provided with one or more first protrusions. Each of the first protrusions contacts the first side wall or the third side wall.

In an embodiment, each of two opposite surfaces of the base of the insulator respectively facing the second side wall and the fourth side wall is provided with one or more second protrusions. Each of the second protrusions contacts the second side wall or the fourth side wall.

In an embodiment, the accommodating space comprises a first space connecting with the first opening and a second space connecting with the first space and the second opening. The tongue plate and the two fixing portions of the cover are disposed in the first space. The two fixing portions are respectively disposed on two opposite sides of the tongue plate. The base is disposed in the second space. A size of the second space matches a size of the base. A length of the first space is less than a length of the second space, or a width of the first space is less than a width of the second space.

In an embodiment, the electrical connector further comprises a plurality of terminals. Each of the terminals comprises a contact part and a soldering part connected to the contact part. The contact part is embedded in the base and the tongue plate of the insulator. An extension direction of the contact part is same as an extension direction of the tongue plate. A surface of the tongue plate facing the third side wall is provided with a plurality of grooves corresponding to the contact parts. Each of the grooves exposes a surface of one corresponding contact part facing the third side wall. The surface of the tongue plate facing the third side wall is further provided with a plurality of first positioning holes disposed between the grooves and connecting with the grooves.

In an embodiment, a surface of the tongue plate facing the first side wall is provided with a plurality of second positioning holes corresponding to the contact parts and exposing surfaces of the contact parts facing the first side wall.

In the electrical connector provided by the present disclosure, an inner surface of the first side wall of the metal shell is provided with the two buckle grooves, the flat plate portion of the cover covers the first opening of the metal shell and is provided with only two fixing portions disposed in the metal shell, each of the fixing portions comprises the first plate, the curved portion, and the second plate that extend from the flat plate portion and are connected in sequence, the outer surfaces of the two curved portions respectively contact the second side wall and the fourth side wall of the metal shell, the two first plates are parallel to the first side wall and contact the first side wall of the metal shell, each of the first plates is provided with one buckle member buckled in one corresponding buckle groove, and the free end of each of the second plates contacts the third side wall of the metal shell. Because the two fixing portions of the cover are in contact with the first, second, third, and fourth side walls of the metal shell, a contact area between the cover and the metal shell is increased, thereby increasing a friction force between the cover and the metal shell. Furthermore, the two fixing portions of the cover are provided with the buckle members buckled in the buckle grooves of the first side wall of the metal shell. These prevent the cover from falling off the metal shell, thereby preventing deviation during soldering of the electrical connector. Moreover, the two fixing portions of the cover are both disposed in the metal shell. Specifically, the two fixing portions are disposed in spaces between the opposite sides of the tongue plate and the metal shell. Therefore, an overall volume of the electrical connector is not increased, and a length of the flat plate portion may be less than or equal to a length of the metal shell, thereby meeting the trend of miniaturization of electrical connectors. In addition, the two buckle grooves may extend toward the second opening to increase a pull-out force of a mated connector.

The present disclosure further provides an electrical connector comprising a metal shell, a cover, and a sealing ring. The metal shell comprises a first side wall, a second side wall, a third side wall, and a fourth side wall connected in sequence. The first side wall, the second side wall, the third side wall, and the fourth side wall define an accommodating space, a first opening, and a second opening. The first opening and the second opening are respectively located at two opposite sides of the accommodating space. The first side wall is provided with two buckle grooves. The cover comprises a flat plate portion. The flat plate portion covers the first opening of the metal shell. A length of the plate portion is greater than a distance from an outer surface of the second side wall to an outer surface of the fourth side wall at the first opening, or a width of the plate portion is greater than a distance from an outer surface of the first side wall to an outer surface of the third side wall at the first opening. The sealing ring is sleeved on a part of the metal shell near the first opening.

In an embodiment, a width of the plate portion is greater than a distance from an outer surface of the first side wall to an outer surface of the third side wall at the first opening.

In an embodiment, the two buckle grooves are rectangular, and an extension direction of the two buckle grooves is a direction from the first opening to the second opening.

In an embodiment, the electrical connector further comprises an insulator and a waterproof glue layer. The insulator is disposed in the accommodating space of the metal shell and comprises a base close to the second opening and a tongue plate extending from the base toward the first opening. The waterproof glue layer is disposed between the base and the metal shell to seal a gap between the base and the metal shell.

In an embodiment, each of two opposite surfaces of the base of the insulator respectively facing the first side wall and the third side wall is provided with one or more first protrusions. Each of the first protrusions contacts the first side wall or the third side wall.

In an embodiment, each of two opposite surfaces of the base of the insulator respectively facing the second side wall and the fourth side wall is provided with one or more second protrusions. Each of the second protrusions contacts the second side wall or the fourth side wall.

In an embodiment, the accommodating space comprises a first space connecting with the first opening and a second space connecting with the first space and the second opening. The tongue plate is disposed in the first space. The base is disposed in the second space. A size of the second space matches a size of the base. A length of the first space is less than a length of the second space, or a width of the first space is less than a width of the second space.

In an embodiment, the electrical connector further comprises a plurality of terminals. Each of the terminals comprises a contact part and a soldering part connected to the contact part. The contact part is embedded in the base and the tongue plate of the insulator. An extension direction of the contact part is same as an extension direction of the tongue plate. A surface of the tongue plate facing the third side wall is provided with a plurality of grooves corresponding to the contact parts. Each of the grooves exposes a surface of one corresponding contact part facing the third side wall. The surface of the tongue plate facing the third side wall is further provided with a plurality of first positioning holes disposed between the grooves and connecting with the grooves.

In an embodiment, a surface of the tongue plate facing the first side wall is provided with a plurality of second positioning holes corresponding to the contact parts and exposing surfaces of the contact parts facing the first side wall.

In the electrical connector provided by the present disclosure, an inner surface of the first side wall of the metal shell is provided with the two buckle grooves for buckling buckle members of a cover to prevent the cover from falling off the metal shell, thereby preventing deviation during soldering of the electrical connector. The two buckle grooves may extend toward the second opening to increase a pull-out force of a mated connector. Furthermore, the sealing ring is sleeved on a part of the metal shell near the first opening to seal the gap between the metal shell and the cover. In addition, the waterproof glue layer may be disposed between the base of the insulator and the metal shell to seal the gap between the base and the metal shell. The sealing ring and the waterproof glue layer make the electrical connector completely waterproof.

DETAILED DESCRIPTION

Technical solutions in embodiments of the present disclosure will be clearly and completely described below in conjunction with accompanying drawings in the embodiments of the present disclosure. Apparently, the described embodiments are merely some of the embodiments of the present disclosure and not all embodiments. All other embodiments obtained by those skilled in the art based on the embodiments of the present disclosure without creative labor are within claimed scope of the present disclosure. In addition, terms such as "first" and "second" mentioned in the present disclosure do not denote any order, quantity, or importance, but rather are only used to distinguish different components.

Figure 1:
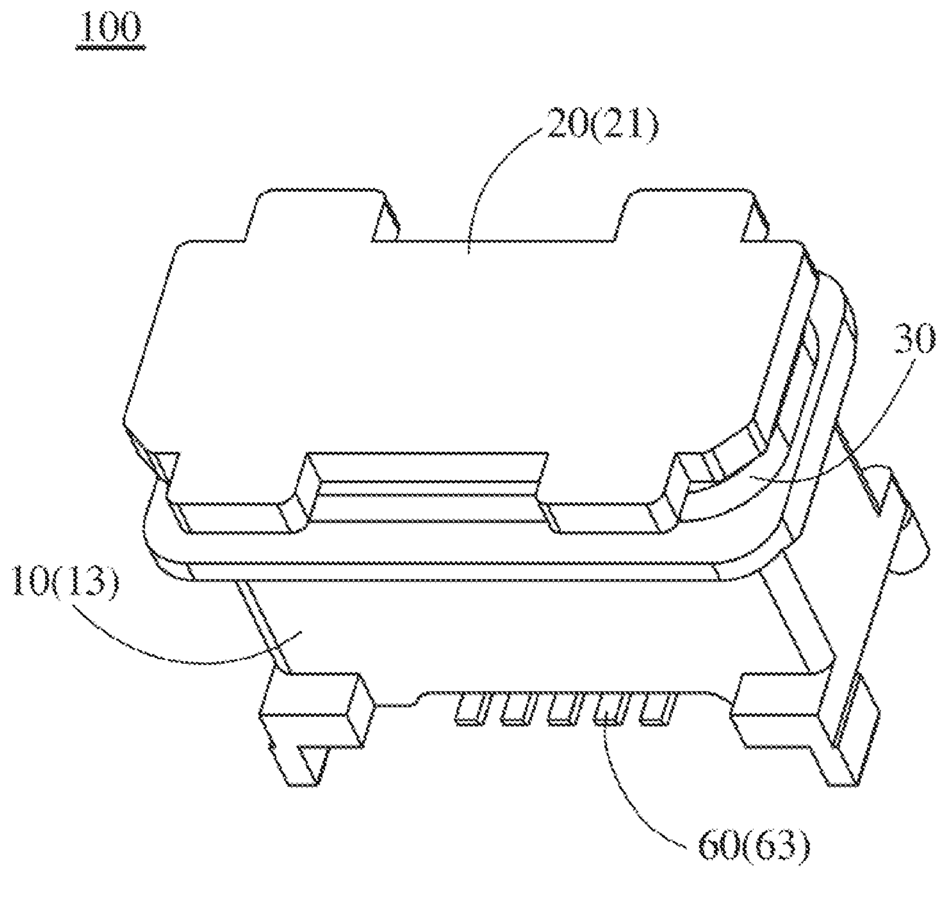
FIG. 1 is a schematic diagram of an electrical connector according to an embodiment of the present disclosure.
Figure 2:
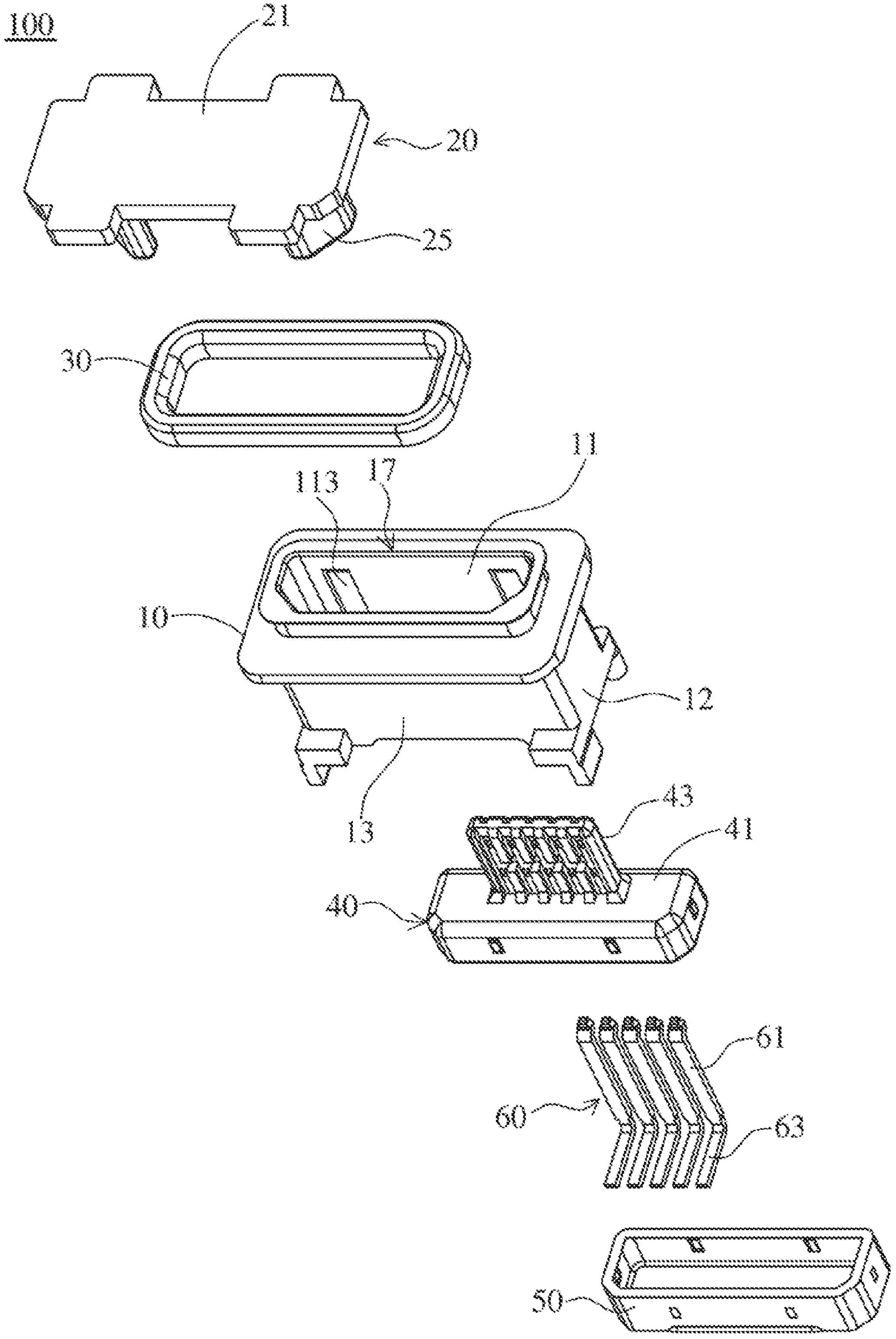
FIG. 2 is an exploded schematic diagram of the electrical connector of FIG. 1.

Please refer to FIG. 1 and FIG. 2. FIG. 1 is a schematic diagram of an electrical connector 100 according to an embodiment of the present disclosure. FIG. 2 is an exploded schematic diagram of the electrical connector 100 of FIG. 1. The electrical connector 100 comprises a metal shell 10, a cover 20, a sealing ring 30, an insulator 40, a waterproof glue layer 50, and a plurality of terminals 60.

Figure 3:
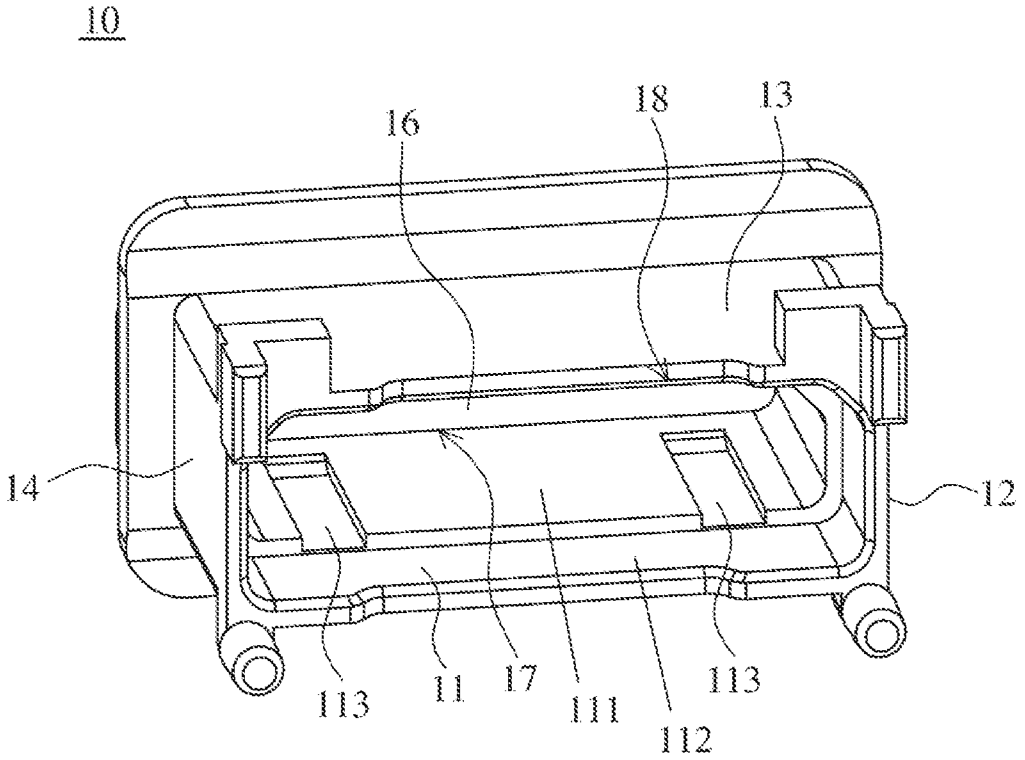
FIG. 3 is a schematic diagram of a metal shell according to an embodiment of the present disclosure.

Please refer to FIG. 3, which is a schematic diagram of the metal shell 10 according to an embodiment of the present disclosure. The metal shell 10 comprises a first side wall 11, a second side wall 12, a third side wall 13, and a fourth side wall 14 connected in sequence. The first side wall 11 is opposite to the third side wall 13, and the second side wall 12 is opposite to the fourth side wall 14. The first side wall 11, the second side wall 12, the third side wall 13, and the fourth side wall 14 define an accommodating space 16, a first opening 17, and a second opening 18. The first opening 17 and the second opening 18 are respectively located at two opposite sides of the accommodating space 16. The first side wall 11 is provided with two buckle grooves 113. Specifically, the two buckle grooves 113 are located on an inner surface of the first side wall 11 facing the third side wall 13. The first side wall 11 comprises a first layer 111 and a second layer 112. The first layer 111 faces the third side wall 13, and the second layer 112 faces the third side wall 13 and is away from the third side wall 13. The first layer 111 is provided with the two buckle grooves 113. An extension direction of the two buckle grooves 113 is a direction from the first opening 17 to the second opening 18. An end of each of the two buckle grooves 113 is flush with a side of the first layer 111 close to the second opening 18.

Figure 4:
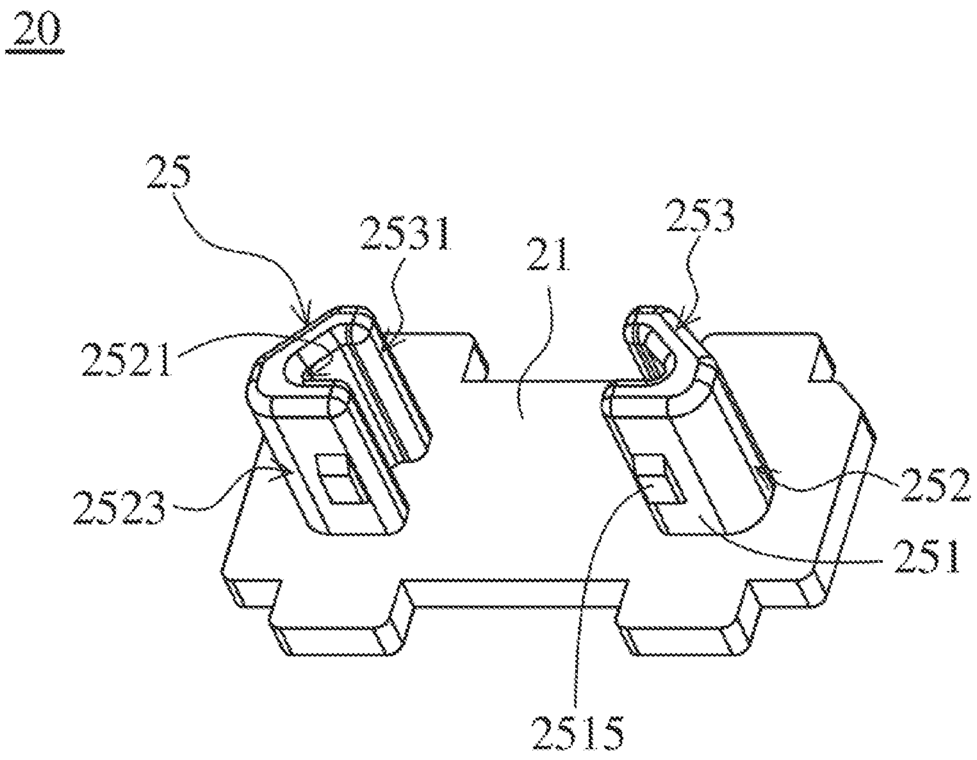
FIG. 4 is a schematic diagram of a cover according to an embodiment of the present disclosure.

Please refer to FIG. 4, which is a schematic diagram of the cover 20 according to an embodiment of the present disclosure. The cover 20 may be made of an insulating material, but is not limited thereto. The cover 20 comprises a flat plate portion 21 and two fixing portions 25. The two fixing portions 25 extend from the flat plate portion 21 and are disposed opposite to each other. Specifically, each of the fixing portions 25 comprises a first plate 251, a curved portion 252, and a second plate 253 that extend from a surface of the flat plate portion 21 and are connected in sequence. Inner surfaces 2521 of the two curved portions 252 face each other. Each of the first plates 251 is provided with a buckle member 2515 buckled in the corresponding buckle groove 113. Specifically, each of the buckle members 2515 is disposed on a surface of one corresponding first plate 251 facing the first side wall 11.

Figure 5:
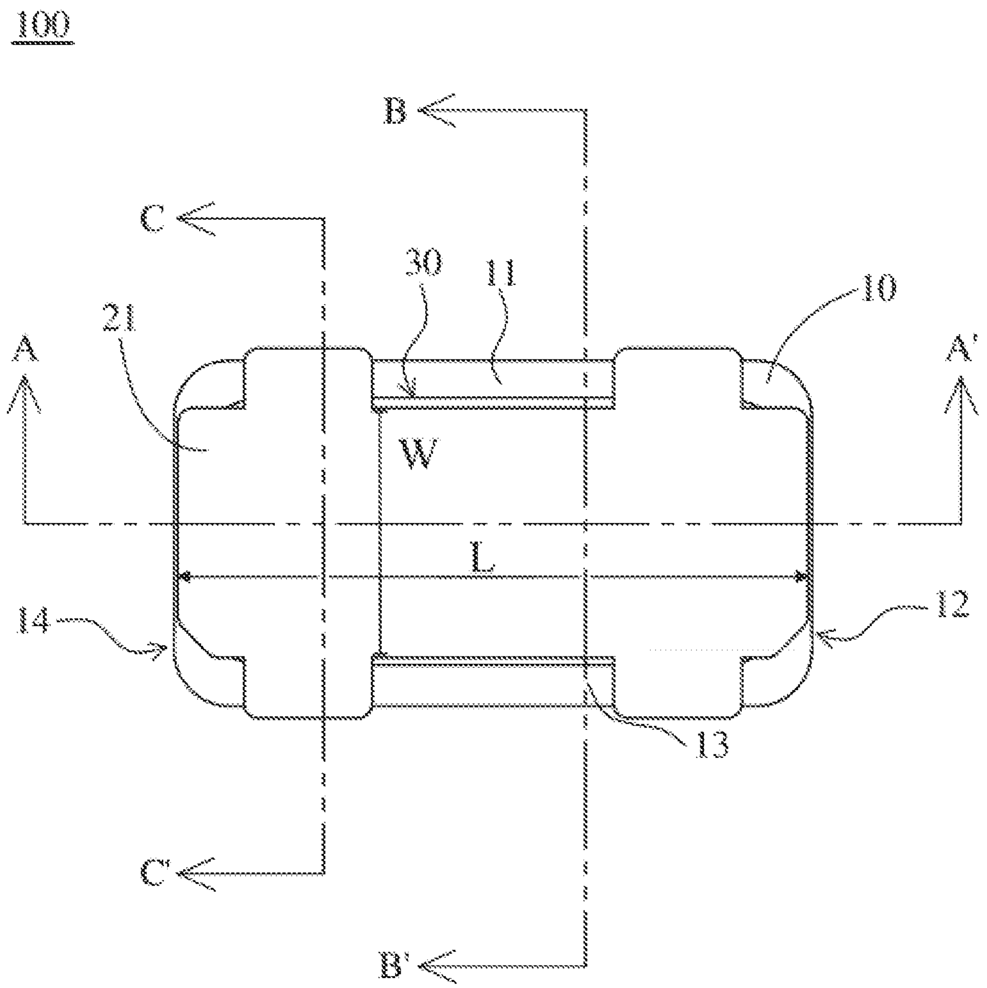
FIG. 5 is a top view of the electrical connector of FIG. 1.
Figure 6:
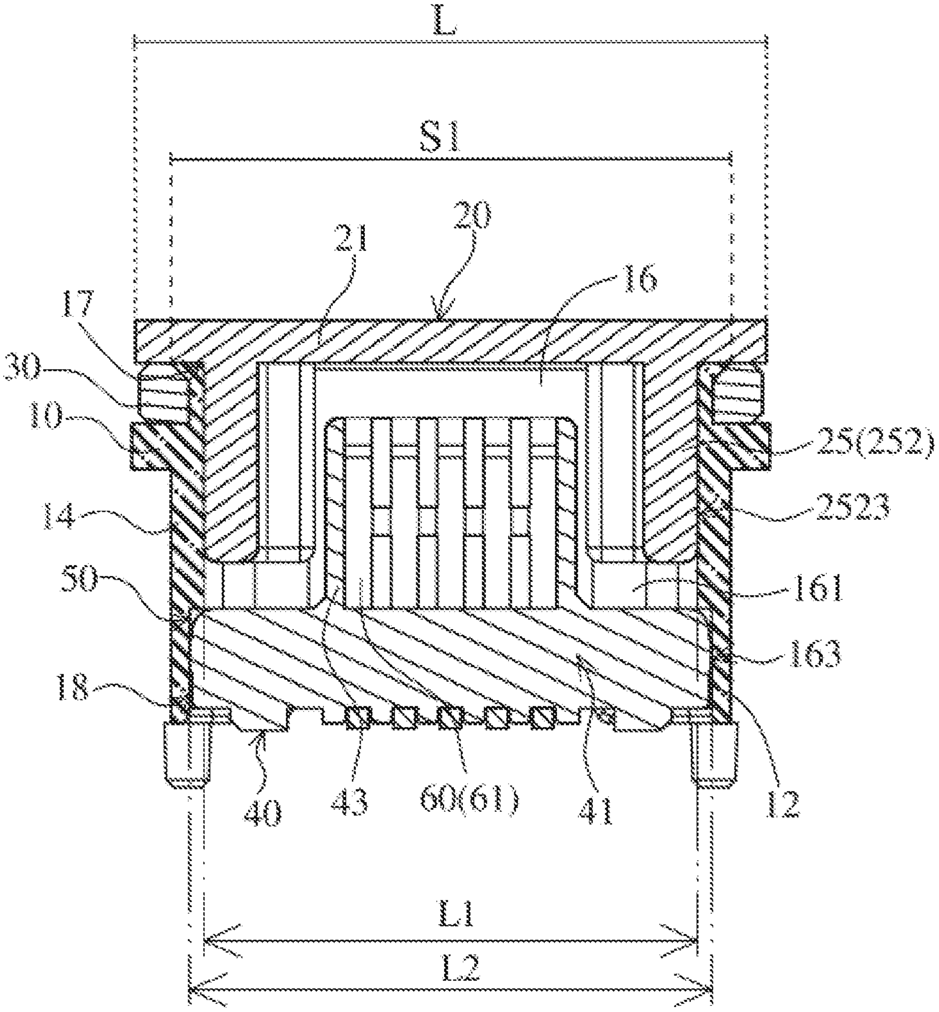
FIG. 6 is a schematic cross-sectional view of the electrical connector of FIG. 5 along a line A-A'.

Please refer to FIG. 6, the flat plate portion 21 covers the first opening 17 of the metal shell 10. Please refer to FIG. 5 and FIG. 6, a length L of the plate portion 21 may be greater than a distance S1 from an outer surface of the second side wall 12 to an outer surface of the fourth side wall 14 at the first opening 17. In an embodiment, please refer to FIG. 5 and FIG. 7, a width W of the plate portion 21 may be greater than a distance S2 from an outer surface of the first side wall 11 to an outer surface of the third side wall 13 at the first opening 17. Please refer to FIG. 4 and FIG. 6, the two fixing portions 25 are disposed in the accommodating space 16 of the metal shell 10. The two curved portions 252 respectively contact the second side wall 12 and the fourth side wall 14. Specifically, outer surfaces 2523 of the two curved portions 252 respectively contact the second side wall 12 and the fourth side wall 14. Please refer to FIG. 4 and FIG. 7, the two first plates 251 are parallel to the first side wall 11. And, surfaces of the two first plates 251 facing the first side wall 11 contact the first side wall 11. Please refer to FIG. 4 and FIG. 7, a free end 2531 of each of the second plates 253 contacts the third side wall 13. Because the first plates 251, the curved portions 252, and the second plates 253 of the two fixing portions 25 of the cover 20 contact the first side wall 11, the second side wall 12, the third side wall 13, and the fourth side wall 14 of the metal shell 10, a contact area between the cover 20 and the metal shell 10 is increased, thereby increasing a friction force between the cover 20 and the metal shell 10. This prevents the cover 20 from falling off the metal shell 10, thereby preventing deviation during soldering of the electrical connector 100.

Figure 8:
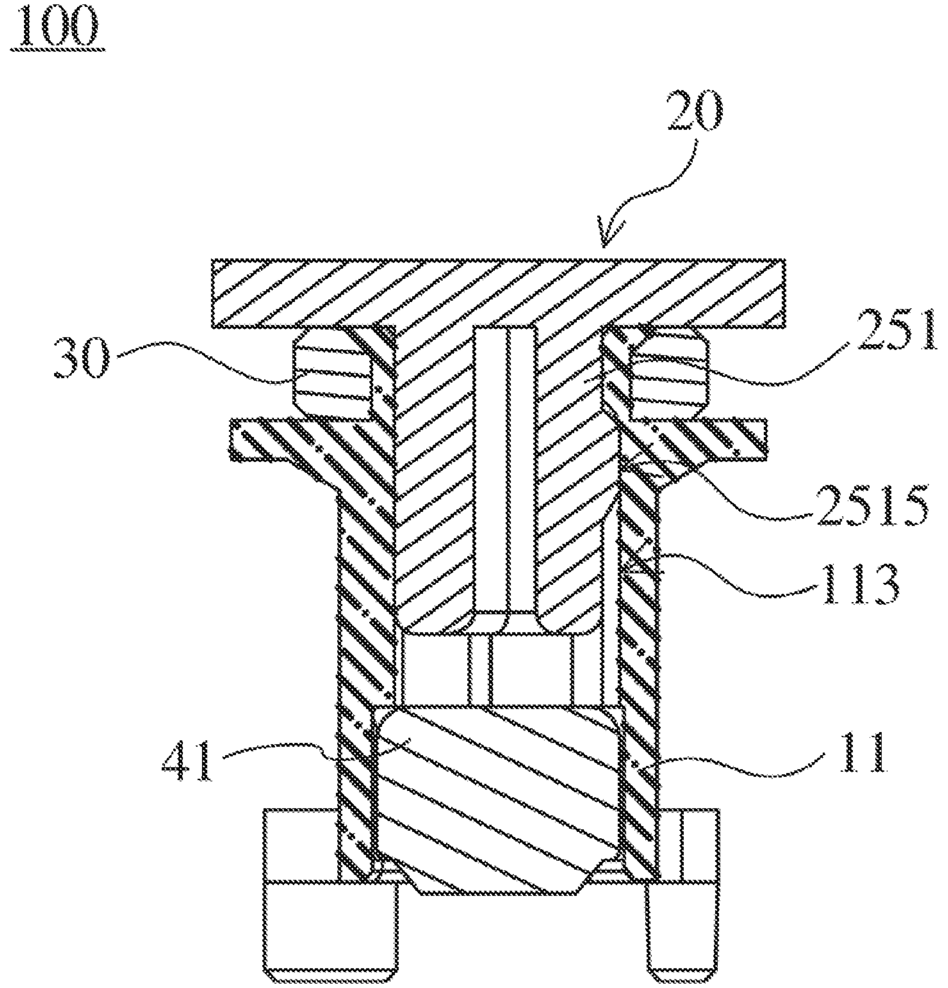
FIG. 8 is a schematic cross-sectional view of the electrical connector of FIG. 5 along a line C-C'.

Please refer to FIG. 4 and FIG. 8, the buckle members 2515 of the two first plates 251 are respectively buckled in the two buckle grooves 113. By buckling the buckle members 2515 to the buckle grooves 113, the cover 20 is further prevented from falling off the metal shell 10, thereby effectively preventing the deviation during the soldering of the electrical connector 100.

Please refer to FIG. 3, the two buckle grooves 113 may extend toward the second opening 18 to increase a pull-out force of a mated connector. That is, the two buckle grooves 113 may be rectangular, the extension direction of the two buckle grooves 113 is the direction from the first opening 17 to the second opening 18, and the two buckle grooves 113 are parallel to each other.

Please refer to FIG. 6, the sealing ring 30 is sleeved on a part of the metal shell 10 near the first opening 17 and contacts the flat plate portion 21 of the cover 20 to seal a gap between the metal shell 10 and the cover 20. The sealing ring 30 may be made of a silica gel, but is not limited thereto.

Figure 7:
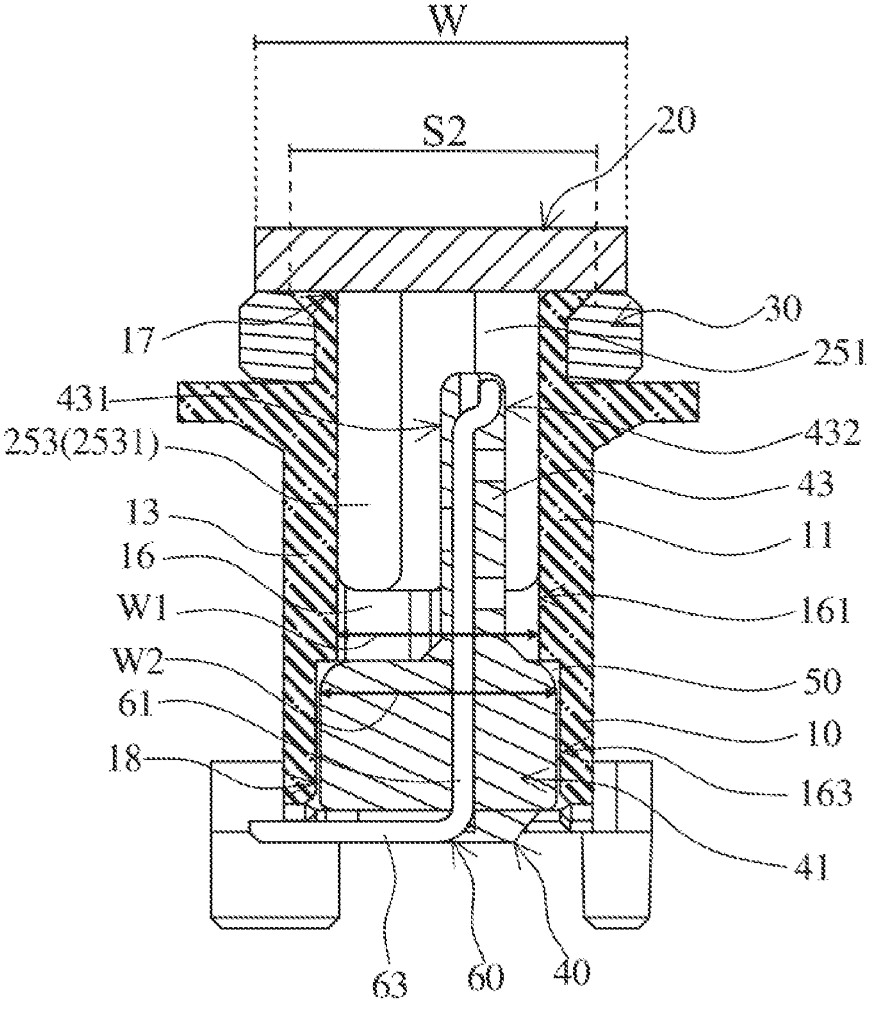
FIG. 7 is a schematic cross-sectional view of the electrical connector of FIG. 5 along a line B-B'.
Figure 9:
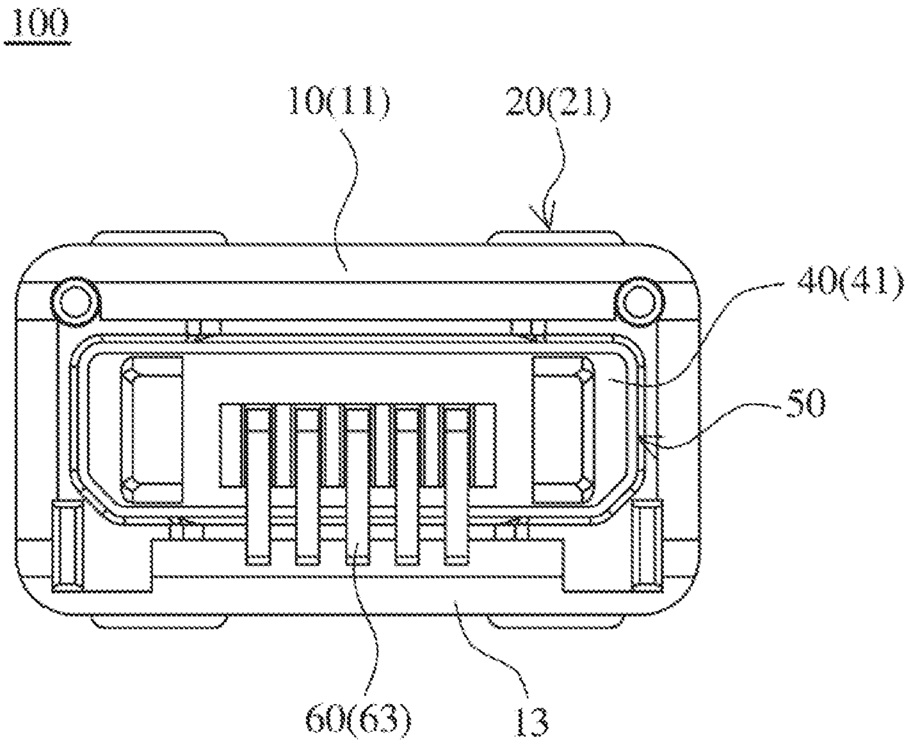
FIG. 9 is a schematic diagram of the electrical connector of FIG. 1 viewed from another perspective.

Please refer to FIG. 6 and FIG. 7, the insulator 40 is disposed in the accommodating space 16 of the metal shell 10. The insulator 40 comprises a base 41 close to the second opening 18 and a tongue plate 43 extending from the base 41 toward the first opening 17. Please refer to FIG. 9, the waterproof glue layer 50 is disposed between the base 41 and the metal shell 10 to seal a gap between the base 41 and the metal shell 10. Specifically, the waterproof glue layer 50 is formed by filling and curing a waterproof glue in the gap between the base 41 and the metal shell 10. Therefore, a shape of the waterproof glue layer 50 is same as a shape of the gap between the base 41 and the metal shell 10.

Please refer to FIG. 7, FIG. 10, FIG. 11, and FIG. 13, each of two opposite surfaces of the base 41 of the insulator 40 respectively facing the first side wall 11 and the third side wall 13 is provided with one or more first protrusions 45. Each of the first protrusions 45 contacts the first side wall 11 or the third side wall 13. In this embodiment, each of the two opposite surfaces of the base 41 of the insulator 40 respectively facing the first side wall 11 and the third side wall 13 is provided with two first protrusions 45. In an embodiment, each of the two opposite surfaces of the base 41 of the insulator 40 respectively facing the first side wall 11 and the third side wall 13 is provided with one, three, four, or five first protrusions 45, but is not limited thereto. Please refer to FIG. 6, FIG. 12, and FIG. 13, each of two opposite surfaces of the base 41 of the insulator 40 respectively facing the second side wall 12 and the fourth side wall 14 is provided with one or more second protrusions 47. Each of the second protrusions 47 contacts the second side wall 12 or the fourth side wall 14. In this embodiment, each of the two opposite surfaces of the base 41 of the insulator 40 respectively facing the second side wall 12 and the fourth side wall 14 is provided with one second protrusion 47. In an embodiment, each of the two opposite surfaces of the base 41 of the insulator 40 respectively facing the second side wall 12 and the fourth side wall 14 is provided with two, three, four, or five second protrusions 47, but is not limited thereto.

The first protrusions 45 and the second protrusions 47 are configured to increase a friction force between the base 41 and the metal shell 10 and ensure that the waterproof glue layer 50 can fill the gap between gap between the base 41 and the metal shell 10, so that the base 41 can be more firmly fixed in the metal shell 10. Two opposite surfaces of the base 41 of the insulator 40 have the same number of the first protrusions 45 or the second protrusions 47, so that friction forces between the two opposite sides of the base 41 and the metal shell 10 are equal to each other. In this embodiment, the first protrusions 45 or the second protrusions 47 on two opposite sides of the base 41 correspond to each other. In an embodiment, the first protrusions 45 or the second protrusions 47 on two opposite sides of the base 41 may be staggered.

Please refer to FIG. 6, the accommodating space 16 comprises a first space 161 connecting with the first opening 17 and a second space 163 connecting with the first space 161 and the second opening 18. The tongue plate 43 and the two fixing portions 25 of the cover 20 are disposed in the first space 161. The two fixing portions 25 are respectively disposed on two opposite sides of the tongue plate 43. Specifically, the two fixing portions 25 are disposed in the spaces between the opposite sides of the tongue plate 43 and the metal shell 10, so that the two fixing portions 25 do not increase an overall volume of the electrical connector 100. Therefore, the electrical connector 100 meets the trend of miniaturization of electrical connectors.

Please refer to FIG. 4, an included angle between one first plate 251 and one second plate 253 is an inner angle of one corresponding curved portion 252. The inner angles of the two curved portions 252 may be 45-60 degrees, but are not limited thereto. The inner angles of the two curved portions 252 and sizes of the first plates 251 and the second plates 253 may be adjusted according to a size of the first space 161, as long as the first plates 251, the curved portions 252, and the second plates 253 can contact the first side wall 11, the second side wall 12, the third side wall 13, and the fourth side wall 14, a space between the two first plates 251 can accommodate the tongue plate 43, and a space between the two second plates 2531 can accommodate the mated connector.

Please refer to FIG. 6, the base 41 is disposed in the second space 163. A size of the second space 163 matches a size of the base 41. A length L1 of the first space 161 may be less than a length L2 of the second space 163. Please refer to FIG. 7, a width W1 of the first space 161 may be less than a width W2 of the second space 163.

Please refer to FIG. 1, the terminals 60 are parallel to each other. Each of the terminals 60 comprises a contact part 61 and a soldering part 63 connected to the contact part 61. A width of the soldering portion 63 is less than or equal to a width of the contact portion 61. Please refer to FIG. 7, the contact part 61 is embedded in the base 41 and the tongue plate 43 of the insulator 40. An extension direction of the contact part 61 is same as an extension direction of the tongue plate 43. An extension direction of the soldering part 63 may be 90 degrees to the extension direction of the contact part 61, and is not limited thereto. In this embodiment, the soldering part 63 extends from the contact part 61 toward the third side wall 13. The soldering part 63 will be soldered to a printed circuit board. The terminals 60 are made of a conductive material, such as metal, but are not limited thereto.

Figure 10:
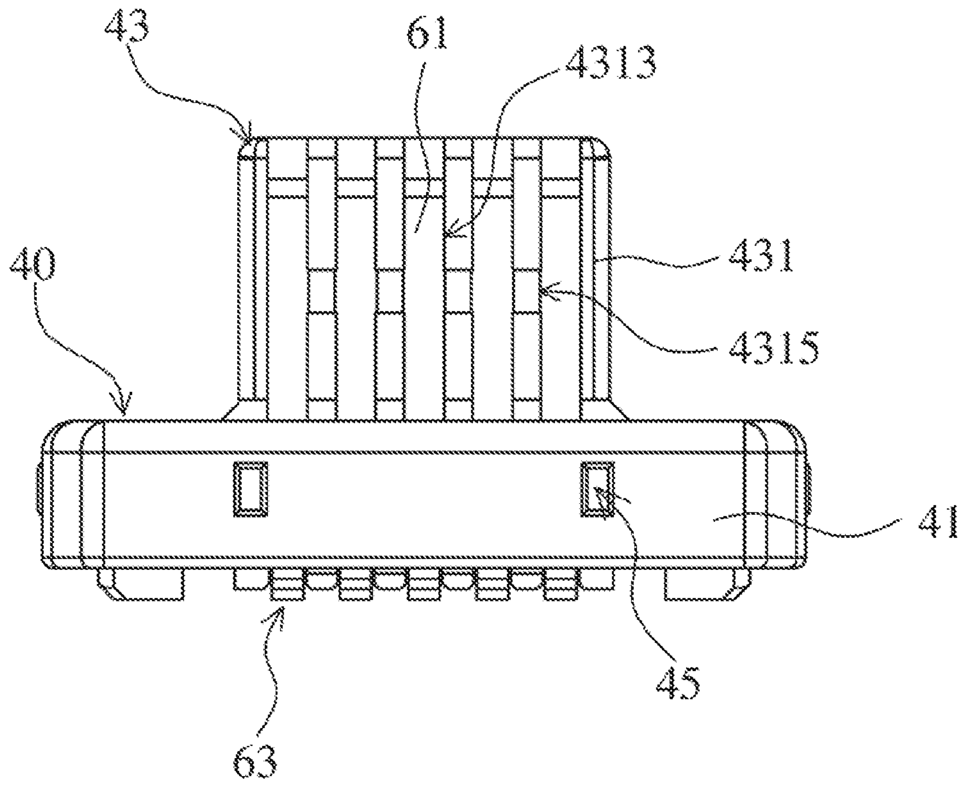
FIG. 10 is a front view of a combination of an insulator and a plurality of terminals according to an embodiment of the present disclosure.

Please refer to FIG. 10, a first surface 431 of the tongue plate 43 facing the third side wall 13 is provided with a plurality of grooves 4313 corresponding to the contact parts 61. The grooves 4313 are parallel to the contact parts 61. Each of the grooves 4313 exposes a surface of one corresponding contact part 61 facing the third side wall 13. The surface of the contact part 61 exposed by the groove 4313 is configured to contact one corresponding terminal of the mated connector to transmit data and/or power. The first surface 431 of the tongue plate 43 facing the third side wall 13 is further provided with a plurality of first positioning holes 4315 disposed between the grooves 4313 and connecting with the grooves 4313. In this embodiment, one first positioning hole 4315 is located between every two grooves 4313. In an embodiment, two or more first positioning holes 4315 may be located between every two grooves 4313.

Figure 11:
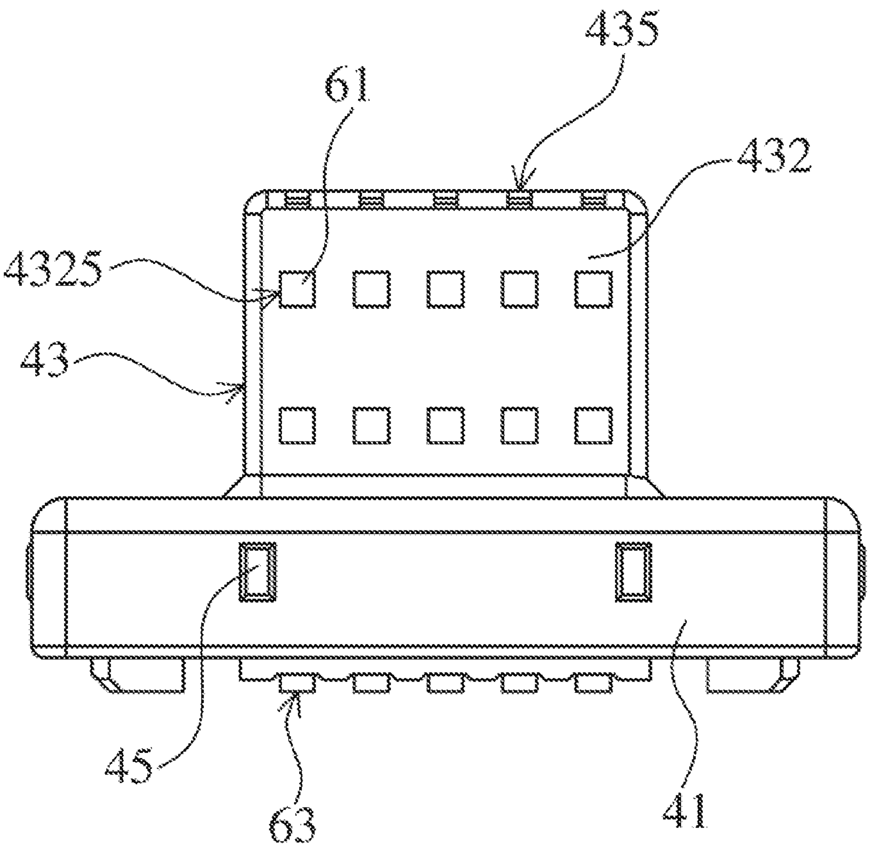
FIG. 11 is a rear view of the combination of the insulator and the terminals of FIG. 10.
Figure 12:
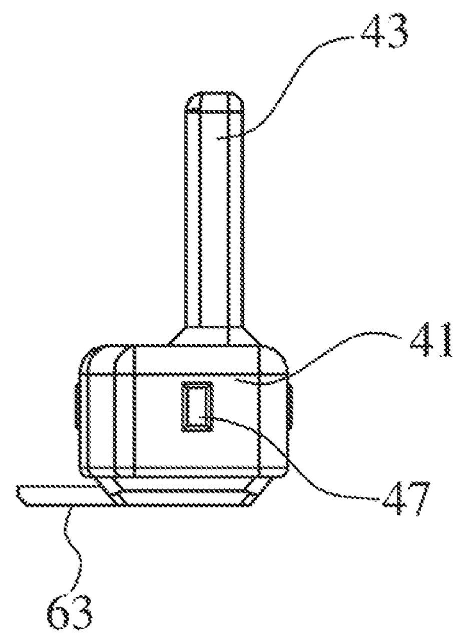
FIG. 12 is a side view of the combination of the insulator and the terminals of FIG. 10.

Please refer to FIG. 11, a second surface 432 of the tongue plate 43 facing the first side wall 11 is provided with a plurality of second positioning holes 4325. The second positioning holes 4325 correspond to the contact parts 61 and expose surfaces of the contact parts 61 facing the first side wall 11. The second positioning holes 4325 are arranged in an array on the second surface 432 of the tongue plate 43. In this embodiment, the tongue plate 43 is provided with two second positioning holes 4325 on each of the contact parts 61. In an embodiment, the tongue plate 43 may also be provided with one, three, or four second positioning holes 4325 on each of the contact parts 61, but is not limited thereto.

Figure 13:
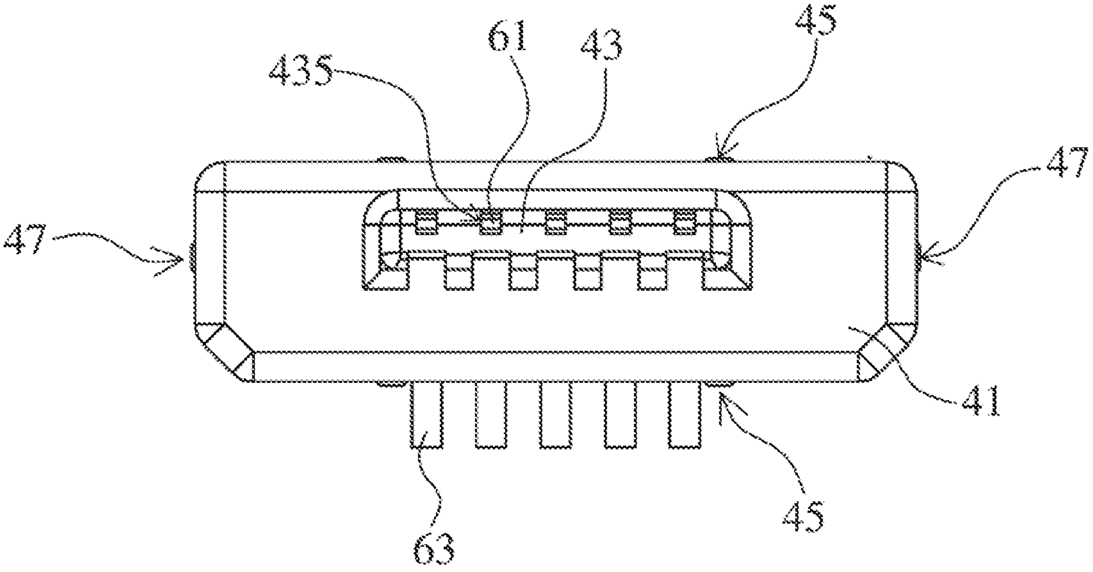
FIG. 13 is a schematic diagram of the combination of the insulator and the terminals of FIG. 10 viewed from another perspective.

Please refer to FIG. 11 and FIG. 13, an end of the tongue plate 43 away from the base 41 is further provided with a plurality of openings 435. The openings 435 correspond to the contact parts 61 and expose front ends of the contact parts 61. The first positioning holes 4315, the second positioning holes 4325, and the openings 435 are configured to ensure that the insulator 40 can fix the contact parts 61 in correct positions in the tongue plate 43 during a manufacturing process.

In the electrical connector provided by the present disclosure, an inner surface of the first side wall of the metal shell is provided with the two buckle grooves, the flat plate portion of the cover covers the first opening of the metal shell and is provided with only two fixing portions disposed in the metal shell, each of the fixing portions comprises the first plate, the curved portion, and the second plate that extend from the flat plate portion and are connected in sequence, the outer surfaces of the two curved portions respectively contact the second side wall and the fourth side wall of the metal shell, the two first plates are parallel to the first side wall and contact the first side wall of the metal shell, each of the first plates is provided with one buckle member buckled in one corresponding buckle groove, and the free end of each of the second plates contacts the third side wall of the metal shell. Because the two fixing portions of the cover are in contact with the first, second, third, and fourth side walls of the metal shell, a contact area between the cover and the metal shell is increased, thereby increasing a friction force between the cover and the metal shell. Furthermore, the two fixing portions of the cover are provided with the buckle members buckled in the buckle grooves of the first side wall of the metal shell. These prevent the cover from falling off the metal shell, thereby preventing deviation during soldering of the electrical connector. Moreover, the two fixing portions of the cover are both disposed in the metal shell. Specifically, the two fixing portions are disposed in spaces between the opposite sides of the tongue plate and the metal shell. Therefore, an overall volume of the electrical connector is not increased, and a length of the flat plate portion may be less than or equal to a length of the metal shell, thereby meeting the trend of miniaturization of electrical connectors. In addition, the two buckle grooves may extend toward the second opening to increase a pull-out force of a mated connector.

The embodiments of the present disclosure are described in detail above, but the above embodiments are not intended to limit the present invention. Those skilled in the art can modify technical solutions recited in the above embodiments, or replace some of technical features in the above embodiments with equivalents, and all such modifications or replacements shall fall within the claimed scope of the present disclosure. The scope of the present invention is determined by claims.

What is claimed is:

1. An electrical connector, comprising:

a metal shell comprising a first side wall, a second side wall, a third side wall, and a fourth side wall connected in sequence, wherein the first side wall, the second side wall, the third side wall, and the fourth side wall define an accommodating space, a first opening, and a second opening, the first opening and the second opening are respectively located at two opposite sides of the accommodating space, the first side wall comprises a first layer and a second layer, the first layer faces the third side wall, the second layer faces the third side wall and is away from the third side wall, the first layer is provided with two buckle grooves, an extension direction of the two buckle grooves is a direction from the first opening to the second opening, and an end of each of the two buckle grooves is flush with a side of the first layer close to the second opening; and a cover comprising:

a flat plate portion covering the first opening of the metal shell, wherein a length of the flat plate portion is greater than a distance from an outer surface of the second side wall to an outer surface of the fourth side wall at the first opening, or a width of the flat plate portion is greater than a distance from an outer surface of the first side wall to an outer surface of the third side wall at the first opening; and two fixing portions extending from the flat plate portion and disposed in the accommodating space of the metal shell, wherein the two fixing portions respectively contact the second side wall and the fourth side wall, or each of the two fixing portions contacts the first side wall and the third side wall.

2. The electrical connector according to claim 1, wherein each of the fixing portions comprises a first plate, a curved portion, and a second plate that extend from the flat plate portion.

3. The electrical connector according to claim 2, wherein the two curved portions respectively contact the second side wall and the fourth side wall, or the two first plates contact the first side wall, and a free end of each of the second plates contacts the third side wall.

4. The electrical connector according to claim 2, wherein each of the first plates is provided with a buckle member buckled in the corresponding buckle groove.

5. The electrical connector according to claim 1, wherein the two buckle grooves are rectangular.

6. The electrical connector according to claim 1, further comprising:

a sealing ring sleeved on a part of the metal shell near the first opening, contacting the flat plate portion of the cover, and sealing a gap between the metal shell and the cover.

7. The electrical connector according to claim 1, further comprising:

an insulator disposed in the accommodating space of the metal shell and comprising a base close to the second opening and a tongue plate extending from the base toward the first opening; and a waterproof glue layer disposed between the base and the metal shell and sealing a gap between the base and the metal shell.

8. The electrical connector according to claim 7, wherein each of two opposite surfaces of the base of the insulator respectively facing the first side wall and the third side wall is provided with one or more first protrusions, and each of the first protrusions contacts the first side wall or the third side wall.

9. The electrical connector according to claim 7, wherein each of two opposite surfaces of the base of the insulator respectively facing the second side wall and the fourth side wall is provided with one or more second protrusions, and each of the second protrusions contacts the second side wall or the fourth side wall.

10. The electrical connector according to claim 7, wherein the accommodating space comprises a first space connecting with the first opening and a second space connecting with the first space and the second opening;

the tongue plate and the two fixing portions of the cover are disposed in the first space;

the two fixing portions are respectively disposed on two opposite sides of the tongue plate;

the base is disposed in the second space;

a size of the second space matches a size of the base; and a length of the first space is less than a length of the second space, or a width of the first space is less than a width of the second space.

11. The electrical connector according to claim 7, further comprising a plurality of terminals, wherein each of the terminals comprises a contact part and a soldering part connected to the contact part, the contact part is embedded in the base and the tongue plate of the insulator, an extension direction of the contact part is same as an extension direction of the tongue plate, a surface of the tongue plate facing the third side wall is provided with a plurality of grooves corresponding to the contact parts, each of the grooves exposes a surface of one corresponding contact part facing the third side wall, and the surface of the tongue plate facing the third side wall is further provided with a plurality of first positioning holes disposed between the grooves and connecting with the grooves.

12. The electrical connector according to claim 7, wherein a surface of the tongue plate facing the first side wall is provided with a plurality of second positioning holes corresponding to the contact parts and exposing surfaces of the contact parts facing the first side wall.

13. An electrical connector, comprising:

a metal shell comprising a first side wall, a second side wall, a third side wall, and a fourth side wall connected in sequence, wherein the first side wall, the second side wall, the third side wall, and the fourth side wall define an accommodating space, a first opening, and a second opening, the first opening and the second opening are respectively located at two opposite sides of the accommodating space, the first side wall comprises a first layer and a second layer, the first layer faces the third side wall, the second layer faces the third side wall and is away from the third side wall, the first layer is provided with two buckle grooves, an extension direction of the two buckle grooves is a direction from the first opening to the second opening, and an end of each of the two buckle grooves is flush with a side of the first layer close to the second opening; and a cover comprising a flat plate portion, wherein the flat plate portion covers the first opening of the metal shell;

wherein a length of the plate portion is greater than a distance from an outer surface of the second side wall to an outer surface of the fourth side wall at the first opening, or a width of the plate portion is greater than a distance from an outer surface of the first side wall to an outer surface of the third side wall at the first opening.

14. The electrical connector according to claim 13, wherein the two buckle grooves are rectangular, and an extension direction of the two buckle grooves is a direction from the first opening to the second opening.

15. The electrical connector according to claim 13, further comprising:

an insulator disposed in the accommodating space of the metal shell and comprising a base close to the second opening and a tongue plate extending from the base toward the first opening; and a waterproof glue layer disposed between the base and the metal shell and sealing a gap between the base and the metal shell.

16. The electrical connector according to claim 15, wherein each of two opposite surfaces of the base of the insulator respectively facing the first side wall and the third side wall is provided with one or more first protrusions, and each of the first protrusions contacts the first side wall or the third side wall.

17. The electrical connector according to claim 15, wherein each of two opposite surfaces of the base of the insulator respectively facing the second side wall and the fourth side wall is provided with one or more second protrusions, and each of the second protrusions contacts the second side wall or the fourth side wall.

18. The electrical connector according to claim 15, wherein the accommodating space comprises a first space connecting with the first opening and a second space connecting with the first space and the second opening;

the tongue plate is disposed in the first space;

the base is disposed in the second space;

a size of the second space matches a size of the base; and a length of the first space is less than a length of the second space, or a width of the first space is less than a width of the second space.

19. The electrical connector according to claim 15, further comprising a plurality of terminals, wherein each of the terminals comprises a contact part and a soldering part connected to the contact part, the contact part is embedded in the base and the tongue plate of the insulator, an extension direction of the contact part is same as an extension direction of the tongue plate, a surface of the tongue plate facing the third side wall is provided with a plurality of grooves corresponding to the contact parts, each of the grooves exposes a surface of one corresponding contact part facing the third side wall, and the surface of the tongue plate facing the third side wall is further provided with a plurality of first positioning holes disposed between the grooves and connecting with the grooves.

20. The electrical connector according to claim 15, wherein a surface of the tongue plate facing the first side wall is provided with a plurality of second positioning holes corresponding to the contact parts and exposing surfaces of the contact parts facing the first side wall.

* * * * *